United States Patent [19]

Kanba

[11] Patent Number: 5,760,752
[45] Date of Patent: Jun. 2, 1998

[54] IMAGE DISPLAY APPARATUS FOR DISPLAYING AN IMAGE CORRESPONDING TO AN IMAGE STATE AT THE TRANSMITTING END

[75] Inventor: Tomonari Kanba, Tokyo, Japan

[73] Assignee: NEC Corporation, Tokyo, Japan

[21] Appl. No.: 791,067

[22] Filed: Jan. 29, 1997

Related U.S. Application Data

[63] Continuation of Ser. No. 274,757, Jul. 14, 1994, abandoned.

[30] Foreign Application Priority Data

Jul. 15, 1993 [JP] Japan ................... 5-175249
Jul. 30, 1993 [JP] Japan ................... 5-190371

[51] Int. Cl.$^6$ ................................ G09G 5/12
[52] U.S. Cl. ................................ 345/2; 345/112
[58] Field of Search ............... 345/1, 2, 112, 345/329, 330, 331; 273/433-438; 434/323; 340/825.17, 870.44; 395/152, 329, 330, 331; 348/14, 18; 463/40, 41; 364/185, 188

[56] References Cited

U.S. PATENT DOCUMENTS

| | | | |
|---|---|---|---|
| 4,715,059 | 12/1987 | Cooper-Hart et al. | 379/53 |
| 4,962,521 | 10/1990 | Komatsu et al. | 348/18 |
| 5,265,888 | 11/1993 | Yamamoto et al. | 463/23 |
| 5,319,363 | 6/1994 | Welch et al. | 340/825.17 |
| 5,371,512 | 12/1994 | Otake et al. | 345/195 |
| 5,396,225 | 3/1995 | Okada et al. | 463/40 |
| 5,490,239 | 2/1996 | Myers | 395/152 |

OTHER PUBLICATIONS

"A Direct Manipulation Interface for Water-Based Rankine Cycle Heat Engines" by Leo Beltracchi, IEEE Transactions On Systems, Man, and Cybernetics, vol. SMC-17, No. 3, May/Jun. 1987, total 10 pages.

"A Support System for Beam Adjustment of Cyclotron Based on Fuzzy Grading Model and Texture Display" by T. Okamura & T. Murakami, Proc. of 11th World Congress of Automatic Control, 4, 57/62 (1990), pp. 57-62.

"Object-Oriented Video: Interaction with Real-world Objects through Live Video" by Tani, Tanikoshi, Futakawa & Tanifuji, CHI '92 Conference Proceedings, May 3-7, 1992, pp. 593-598, ACM Press.

"Model Based Synthesis Image Coding System Modeling a Person's Face and Synthesis of Facial Expressions" by K. Aizawa, H. Harashima & T. Saito, IEEE/IEICE, Global Telecommunications Conference, 2.3, (total 5 pages), Nov. 1987.

"Distributed Cooperative Control for Sharing Applications Based on Multiparty and Multimedia Desktop Conferencing System: Mermaid" by T. Ohmori, K. Maeno, S. Sakata, H. Fukuoka & K. Watabe, Proceedings of the 12th International Conference on Distributed Computing Systems, pp. 538-546 (Jun. 9-12, 1992).

*Primary Examiner*—Jeffery Brier
*Attorney, Agent, or Firm*—Sughrue, Mion, Zinn, Macpeak & Seas, PLLC

[57] ABSTRACT

An image display apparatus for causing a receiving end to display, in a form of an image, a state of a transmitting end, which is transmitted through a communication line whose transmission amount is limited, includes a converting unit and a control unit. The converting unit receives a state signal from the transmitting end at the receiving end and converts the state signal into a control signal. The control unit reads out and displays stored image information at the receiving end in accordance with the control signal.

4 Claims, 11 Drawing Sheets

CONTENTS

| Video Sequence | Contents |
|---|---|
| v01 (f01...f30) | FACING RIGHT |
| v02 (f01...f30) | FACING UPPER LEFT |
| v03 (f01...f30) | FACING UPWARD |
| v04 (f01...f30) | FACING UPPER RIGHT |
| v05 (f01...f30) | FACING RIGHT |
| v11 (f01...f30) | LAUGHING |
| v21 (f01...f30) | ANGRY |
| v31 (f01...f30) | SPEAKING |

FRAME NUMBER IN SEQUENCE

FIG. 3

| CURRENTLY DISPLAYED FRAME NUMBER | INPUT TO DISPLAY FRAME DETERMINING MEANS | FRAME NUMBER OF FRAME TO BE DISPLAYED NEXT |
|---|---|---|
| v01:f01 | LAUGHING | v11:f01~v11:f30 |
| v01:f01 | SPEAKING | v31:f01~v31:f30 |
| v01:f01 | → | v01:f01~v01:f30 |
| v01:f01 | ↑ | v03:f01~v03:f30 |
| v01:f30 | ↑ | v02:f30~v03:f30 |

| CURRENTLY DISPLAYED FRAME NUMBER | INPUT SIGNAL | FRAME NUMBER OF FRAME TO BE DISPLAYED NEXT |
|---|---|---|
| v02 : fn | ↑ | v03 : fn |
| v02 : fn | → | v01 : fn |

IMAGE DISPLAY APPARATUS FOR DISPLAYING AN IMAGE CORRESPONDING TO AN IMAGE STATE AT THE TRANSMITTING END

This is a Continuation of application Ser. No. 08/274,757 filed Jul. 14, 1994 now abandoned.

BACKGROUND OF THE INVENTION

The present invention relates to an image display apparatus for allowing a user to use a video image to understandably display a signal transmitted from a partner connected through a communication line whose transmission amount is limited and, more particularly, to an image display apparatus for displaying an image in a video phone, an electronic conference system, an information terminal, or the like.

Figure 11:
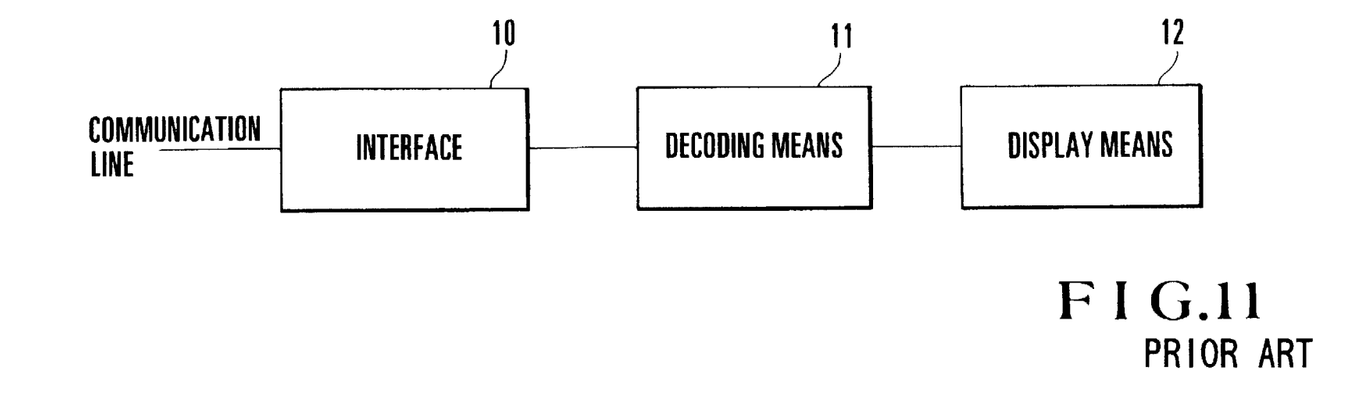
FIG. 11 is a block diagram showing the arrangement of a conventional apparatus.

A signal transmitted from a partner connected through a communication line is conventionally displayed on a display device such as a display, for example, as shown in FIG. 11. The signal is received through an interface 10 and decoded by a decoding means 11. The decoded data is displayed on a display means 12. If the signal transmitted from the transmitting end is video image data, the receiving end directly displays it as a video image.

This scheme is employed when the signal transmitted from the transmitting end is video image data. The video image data include video images in a monitor system, a video phone, and the like. This scheme is applied to a plant control system or the like such that a condition in a plant is picked up with a monitor camera, the resultant video image is transmitted, and a terminal side displays this video image on a display screen.

Such a system is described in, e.g., Reference 1, i.e., "Object-Oriented Video: Interaction with Real-world Objects Through Live Video, Tani, Tanikoshi, Futakawa, & Tanifuji, CHI '92 Conference Proceedings, pp. 593–598, ACM Press".

In a video phone or the like, a video image representing a face at a transmitting end is transmitted through a communication line, and a receiving side displays this video image on a display screen. When the video signal is a coded signal, the coded signal is decoded, and the decoded signal is displayed. Such a system and its coding method are described in Reference 2, K. Aizawa, H. Harashima and T. Saito: "Model Based Synthesis Image Coding System Modeling a Person's Face and Synthesis of Facial Expressions", IEEE/IEICE, Global Telecommunications Conference, 2.3 (November 1987).

Transmission of such a video image in an electronic conference system using a computer is described in Reference 3, T. Ohmori, K. Maeno, S. Sakata, H. Fukuoka and K. Watabe: "Distributed Cooperative Control for Sharing Applications Based on Multiparty and Multimedia Desktop Conferencing System: MERMAID", Proceedings of the 12th International Conference on Distributed Computing Systems, pp. 538–546 (1992). In this reference, the video image is input from a video camera and compressed into data at 64 kb/s by a video codec, the compressed data is transmitted onto a communication line, and a receiving end decodes this transmitted data and displays it on a display screen.

Figure 12:
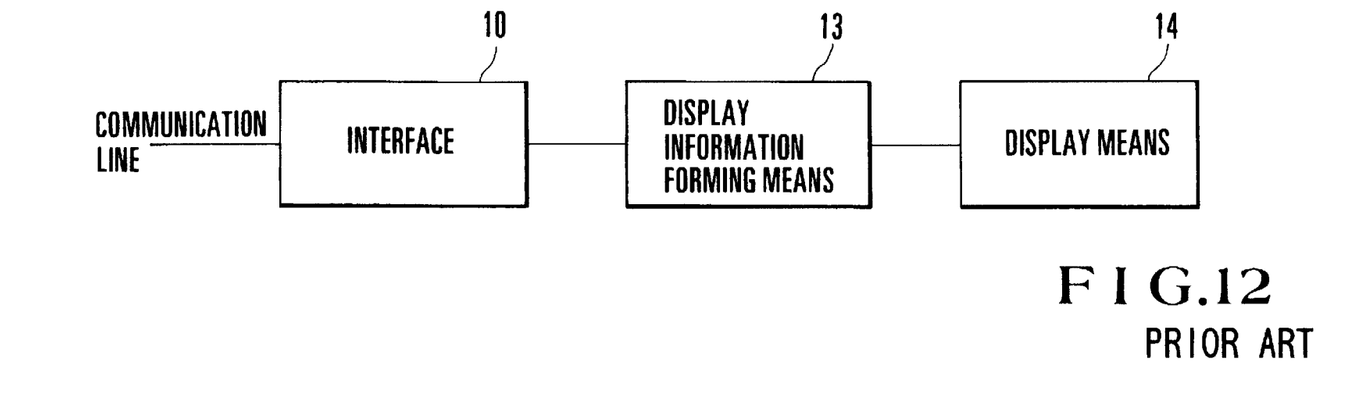
FIG. 12 is a block diagram showing the arrangement of another conventional apparatus.

If a signal transmitted from a transmitting end is a text string such as ASCII characters, information received through an interface 10 is processed by a display information forming means, as shown in FIG. 12. The processed information is directly displayed on a display means 14, or the color of a button displayed on a screen depending on a type of character string is changed.

An example is a process computer system in an atomic power plant, wherein an alarm state of the plant is indicated such that alarm contents and the current value of the corresponding channel are sequentially displayed/printed at an output terminal, as described in Reference 4, LEO BELTRACCHI: "A Direct Manipulation Interface for Water-Based Rankine Cycle Heat Engines", IEEE TRANSACTIONS ON SYSTEMS, MAN, AND CYBERNETICS, VOL. SMC-17, NO. 3, MAY/JUNE 1987.

Measured values are plotted in a graph to allow an operator to intuitively grasp a large amount of data in a process monitor operation, as described in Reference 5, T. Okamura and T. Murakami: "A Support System for Beam Adjustment of Cyclotron Based on Fuzzy Grading Model and Texture Display", Proc. of 11th World Congress of Automatic Control, 4.57/62 (1990). Understandable visualization of the transmitted data utilizing a computer graphics technique has been conventionally practiced.

Although transmission of a video image has an advantage in that a user can intuitively grasp the state of a partner, this transmission requires a high-speed, large-capacity communication line or a high-performance codec unit to transfer the video image. For example, in Reference 3, "Distributed Cooperative Control for Sharing Applications based on Multiparty and Multimedia Desktop Conferencing System: MERMAID", the faces of participants are picked up in the form of video images, and the video images are transmitted, so that each participant can watch the faces of other participants, thereby increasing a feeling of intimacy.

However, in this case, the codec unit for compressing a video signal at 64 kb/s and an ISDN line as a channel for transmitting the compressed video signal are undesirably required.

When a signal from the transmitting end is transmitted as a text string such as an ASCII character string, the requirements for the communication line are less strict than those for a video signal. However, when the text string signal is directly received and displayed at a receiving end, numeric values and characters are simply enumerated to result in poor readability.

In addition, to convert these signals into graphics data and display the graphics data, a large calculation amount for displaying the graphics data is required, and at the same time, a display with a feeling of "presence" like a display upon reception of a video signal cannot be performed.

In Reference 4, "A Direct Manipulation Interface for Water-Based Rankine Cycle Heat Engines", as an example of the process monitor system, the plant alarm contents and the current value of the corresponding channel are sequentially displayed/printed. In Reference 5, "A Support System for Beam Adjustment of Cyclotron Based on Fuzzy Grading Model and Texture Display", the measurement value can be plotted in a graph. However, it is impossible to display the state of a monitor target in the form of a video image on the basis of the transmitted data unless a high-speed, large-capacity communication path or a high-performance codec unit is used. Even in the high-speed, large-capacity communication line used in a time-sharing manner, if the number of time slots assigned to the transmitted data is small, a display time is undesirably prolonged.

In any case, it is difficult to perform a display with "reality" in a communication line whose transmission amount is limited.

SUMMARY OF THE INVENTION

The present invention has been made in consideration of the above situation, and has as its object to display an image with "reality" even in use of a communication line whose transmission amount is limited.

In order to achieve the above object of the present invention, there is provided an image display apparatus for causing a receiving end to display, in a form of an image, a state of a transmitting end, which is transmitted through a communication line whose transmission amount is limited, comprising converting means for receiving a state signal from the transmitting end at the receiving end and converting the state signal into a control signal, and control means for reading out and displaying stored image information at the receiving end in accordance with the control signal.

DESCRIPTION OF THE PREFERRED EMBODIMENT

Figure 1:
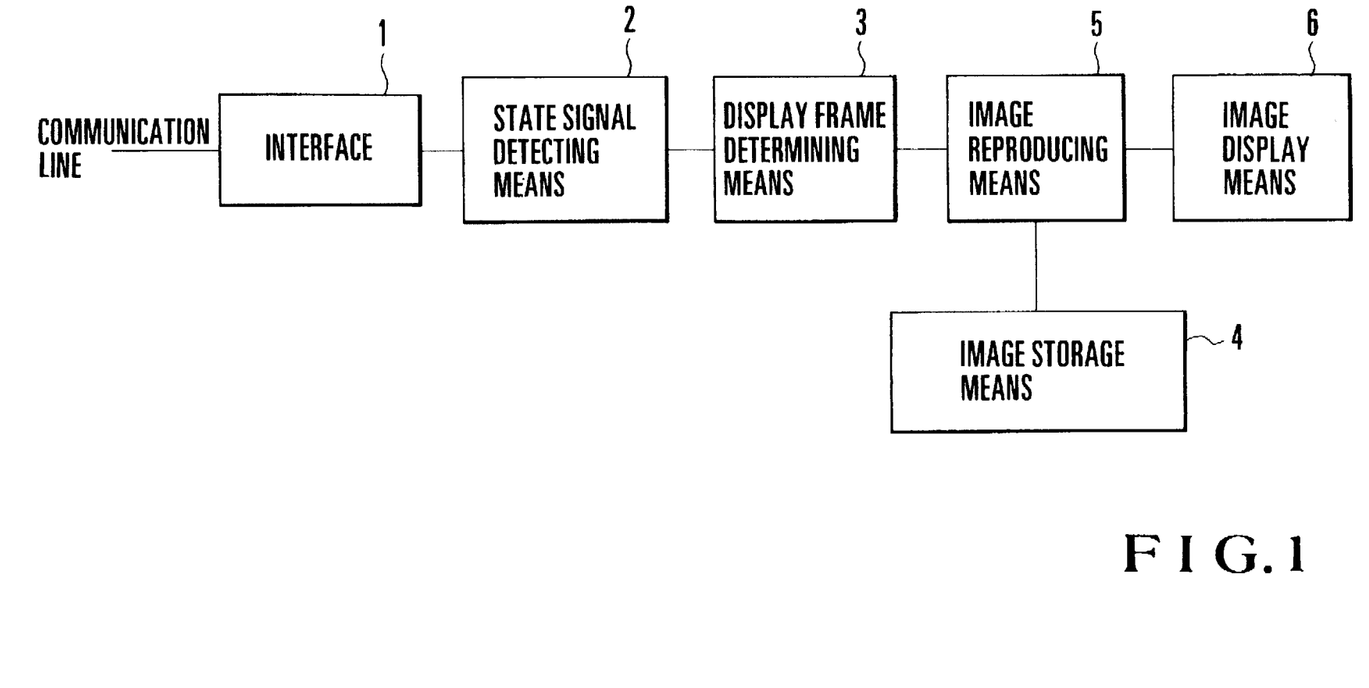
FIG. 1 is a block diagram showing an arrangement according to an embodiment of the present invention.

FIG. 1 shows the arrangement of an apparatus according to an embodiment of the present invention. An interface 1 receives a signal transmitted through a radio channel or a wired communication line. This interface is a commercially available modem or interface board. The interface has protocol control or an error correction function so as to correspond to transmission signals having a variety of speeds.

A state signal detecting means 2 has a function of converting a state signal, representing a partner's state and received from a communication line through the interface, into a control signal for selecting an image displayed at a receiving end. A digital processing unit such as a microprocessor can be used because an output from the interface 1 and an output from the state signal detecting means 2 are digital signals. A display frame determining means 3 which receives a control signal is arranged in the same manner as described above.

The display frame determining means 3 has a function of converting the control signal from the state signal detecting means 2 into a frame number or a set of frame numbers of a video image to be displayed. An image storage means 4 comprises a means for storing video images and can utilize a hard disk, a video tape recorder, a laser disk, a semiconductor memory, or a CD-ROM. Some of these devices may be arranged parallel to each other and used.

An image reproducing means 5 controls the image storage means 4 on the basis of an output from the display frame determining means 3 and selects and reads out necessary ones of images stored in the image storage means 4. The image reproducing means 5 can utilize calculation functions of a personal computer, a workstation, a microprocessor, or the like.

The image storage means 4 has a reproduction function as in a pair of a video tape recorder and its reproducing device or a pair of a laser disk and its reproducing device, the image reproducing means 5 sends an instruction for controlling its reproduction function. In this case, an image display means 6 is connected to the image storage means 4 and displays its output.

When the image storage means 4 does not have a reproduction function as in a hard disk or semiconductor memory, the image reproducing means 5 reads out video image data from such a storage means, reproduces it, and transmits the reproduction result to the image display means 6.

A video tape recorder reproducing device controllable from a personal computer is exemplified by an NEC PV-S98, and its operation manual describes that an instruction is sent in the form of an ASCII code through an RS232C cable to perform necessary control. A laser disk reproducing device controllable from a personal computer is exemplified by a Pioneer Laser Disk Player LD-V540, and its operation manual describes that the device can be controlled from the computer main body through an RS232C cable.

A system capable of controlling to reproduce and display video data stored in a hard disk or semiconductor memory is described in Reference 7, i.e., "AV Expansion of Hiper Station Object-Oriented GUI Tool InterVews, Sakagami, Hamakawa, & Rekimoto, 45th (fall, 1992) National Conference 5B-01, the Institute of Information Processing".

The image display means 6 displays a video image reproduced by the image reproducing means 5 or the video storage means 4 and can uses a display device such as a CRT monitor.

The apparatus of the present invention controls a pre-stored video image to display it on the basis of a signal transmitted through a communication line. For example, in a conventional video phone, a video image obtained by picking up a state at a transmitting end is transmitted, and the transmitted image is reproduced at a receiving end. In the apparatus of the present invention, even if a video image is not transmitted from the transmitting end, the video image can be displayed at the receiving end.

For example, when states such as "speaking", "facing right", and "laughing" of a person at a transmitting side are detected and only pieces of information representing these states are transmitted from the transmitting end, the receiving side retrieves an "image representing speaking", an "image representing facing right", and an "image representing laughing" corresponding to the states at the transmitting side from the stored video images and displays the retrieved images. In this manner, the state at the transmitting end need not coincide with that at the receiving end in a strict sense. It suffices that the state at the transmitting end roughly corresponds to that at the receiving end.

As another example, assume that a transmitting end is connected to a given apparatus, and that a signal representing an operating state of the given apparatus is kept transmitted to a receiving end. In this case, when a signal representing an abnormality is not transmitted from the transmitting end, the display device at the receiving end always displays a video image representing "laughing". When the signal representing the abnormality is transmitted, a video image representing "shouting" can be displayed on the display device at the receiving end. At the receiving end, the video image representing "shouting" can be more intuitively understood than characters representing an "abnormality".

Figure 2:
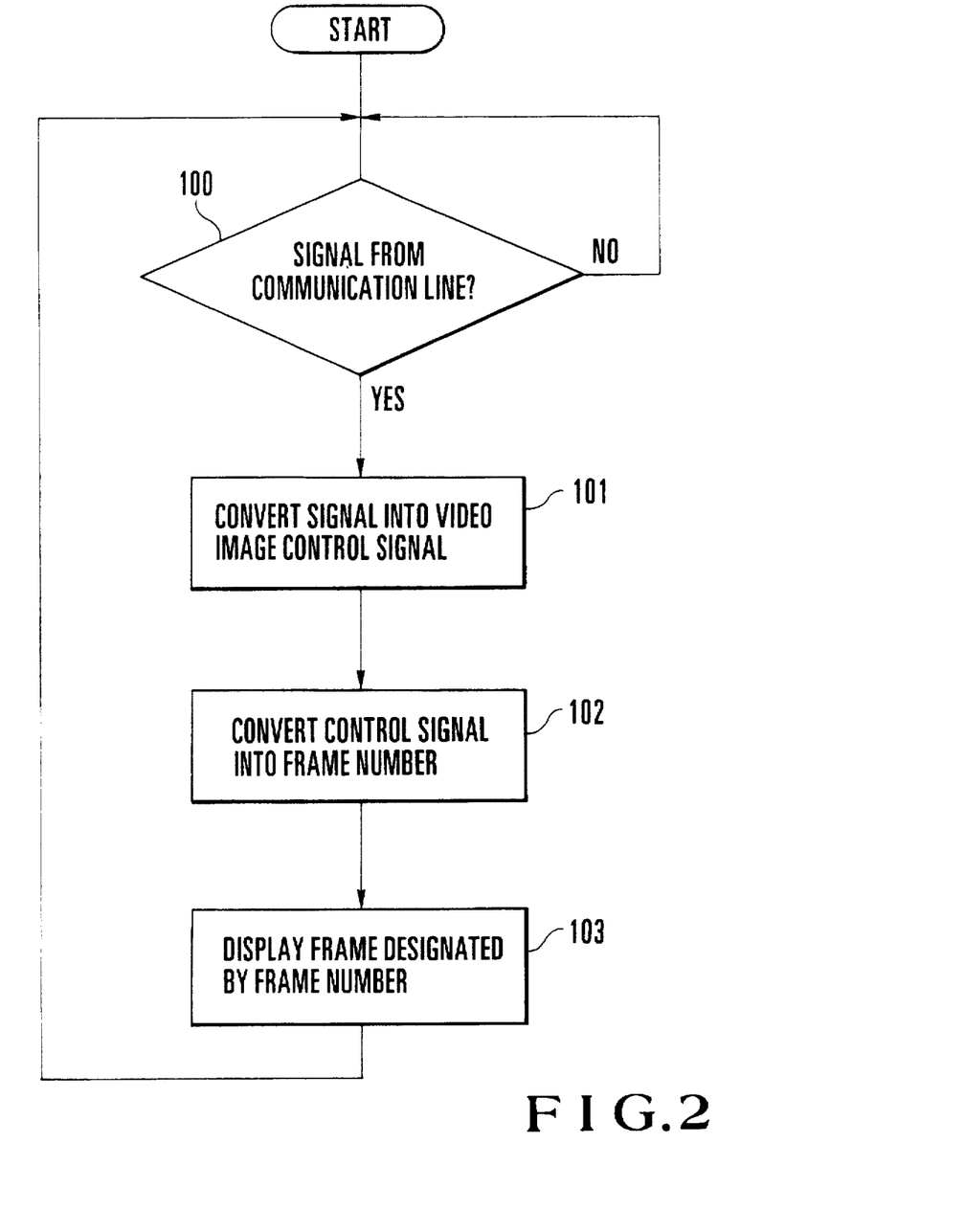
FIG. 2 is a flow chart showing the operations in FIG. 1.
Figure 3:
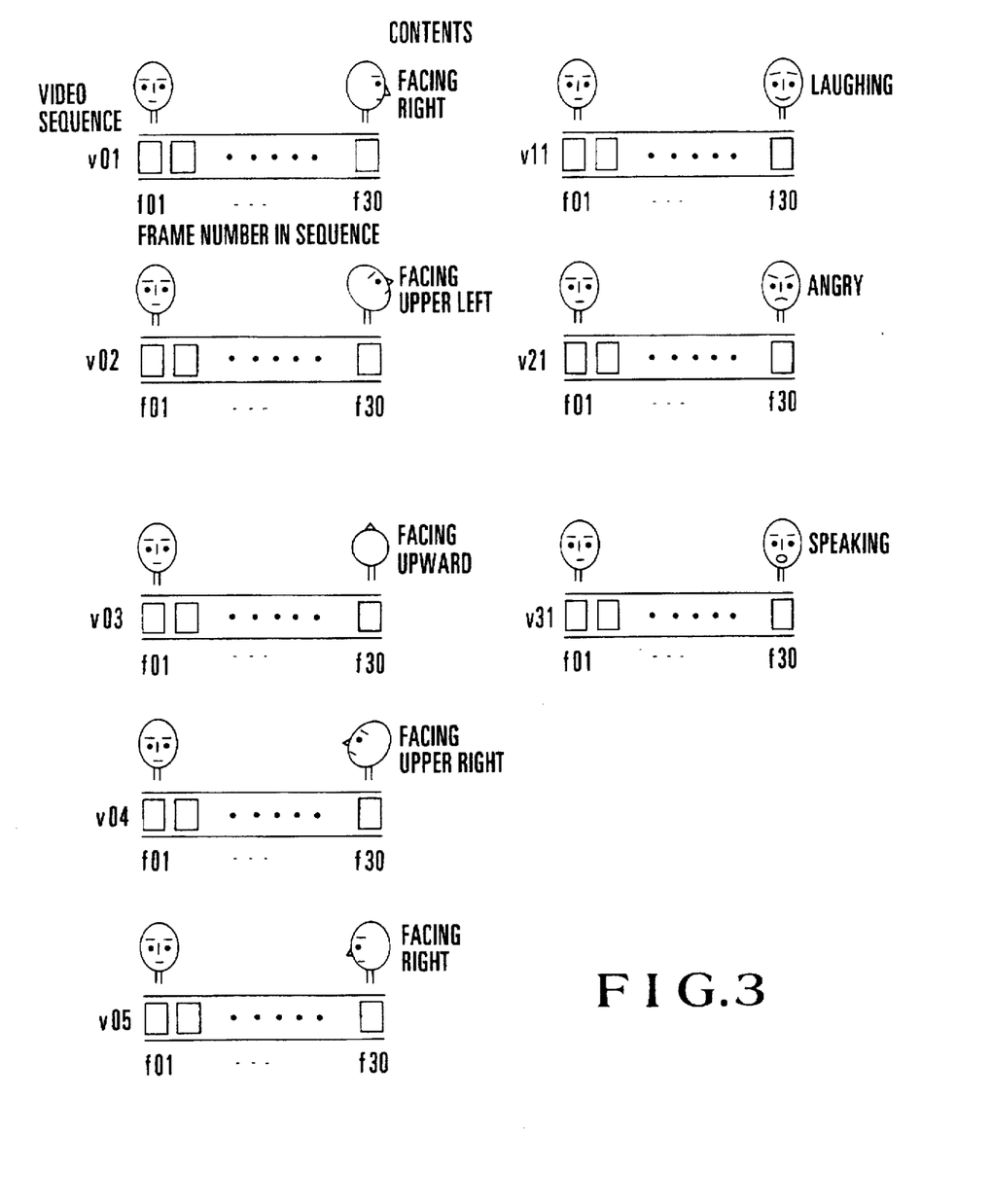
FIG. 3 is a view showing pieces of image information to be stored.

FIG. 2 is a flow chart showing a processing sequence for displaying a video image. In the following description, assume that faces representing various states of a person at a transmitting end along the communication line are picked up and recorded in the image storage means 4. More specifically, assume that frames shown in FIG. 3 are stored in the image storage means 4. There are eight video sequences v01 to v05, v11, v21, and v31 in FIG. 3. Each video sequence has frame numbers f01 to f30. Each frame has a frame number combined with a sequence, such as "v02:f15". For example, a scene in which a person's face looking straight is turned to the left is stored as the video sequence v01.

Referring to FIG. 2, it is determined in step 100 whether a signal transmitted from a communication line is present. If YES in step 100, an input signal is converted into a control signal by the state signal detecting means 2 in step 101. However, if NO in step 100, control is set in a standby state.

A signal to be transmitted is, e.g., a signal representing an operating state of an apparatus connected to a partner on the communication line or a signal representing a working state or face direction of a person at the partner side on the communication line. The signal to be transmitted may be any signal if it is a digital signal string. The converted signal represents a video image to be displayed and is a signal string which can be interpreted by the display frame determining means 3.

For example, assume that a signal representing the operating state of a given machine is transmitted from a transmitting end through a communication line. Also assume that the state signal detecting means 2 switches the video signal between three states, i.e., "laughing", "normal", "angry" in accordance with the magnitudes of values representing the states at the transmitting end. For example, in a state of a lightly loaded machine, an image representing a "laughing face" is output. In a state of a heavily loaded machine, an image representing an "angry face" is output. An output signal is used to select a video signal. Such a correlation is given in the form of a table shown in FIG. 4. The correlation is not limited to that in the table, but may be given by a calculation expression or program.

In step 102, in accordance with the current frame number and an output from the state signal detecting means 2, the display frame determining means 3 performs conversion to obtain a frame number representing an image to be displayed next, thereby obtaining a frame number or a set of frame numbers of a video image to be displayed. Note that the current frame number is supplied from the video image reproducing means 4 to the display frame determining means 3.

Figure 4:
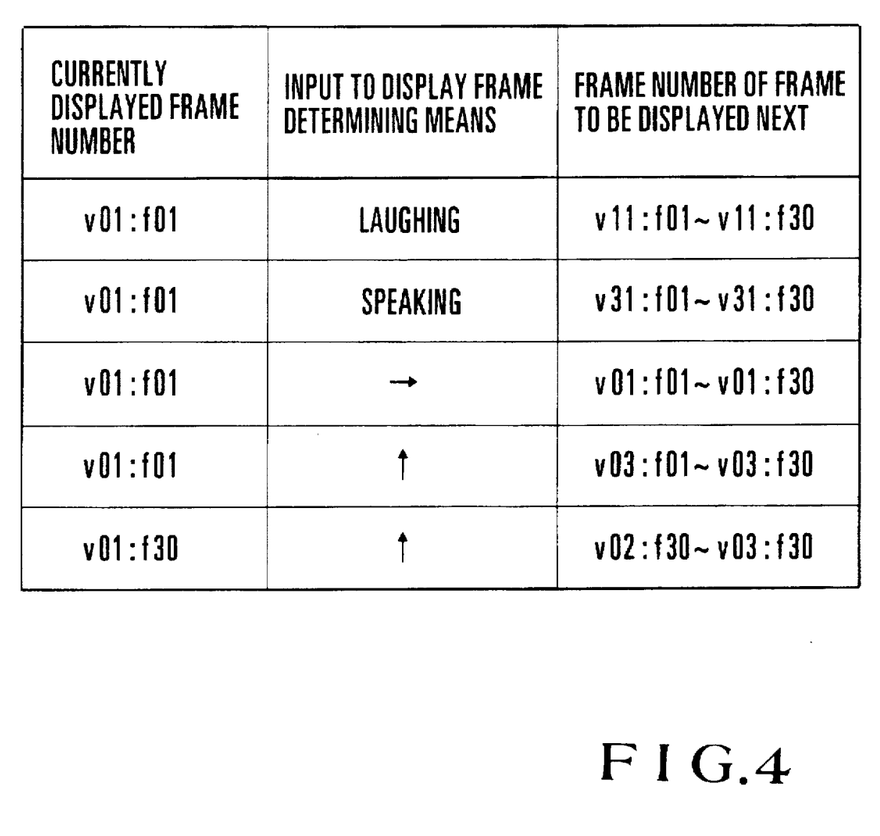
FIG. 4 is a table for determining information to be displayed.
Figure 6:
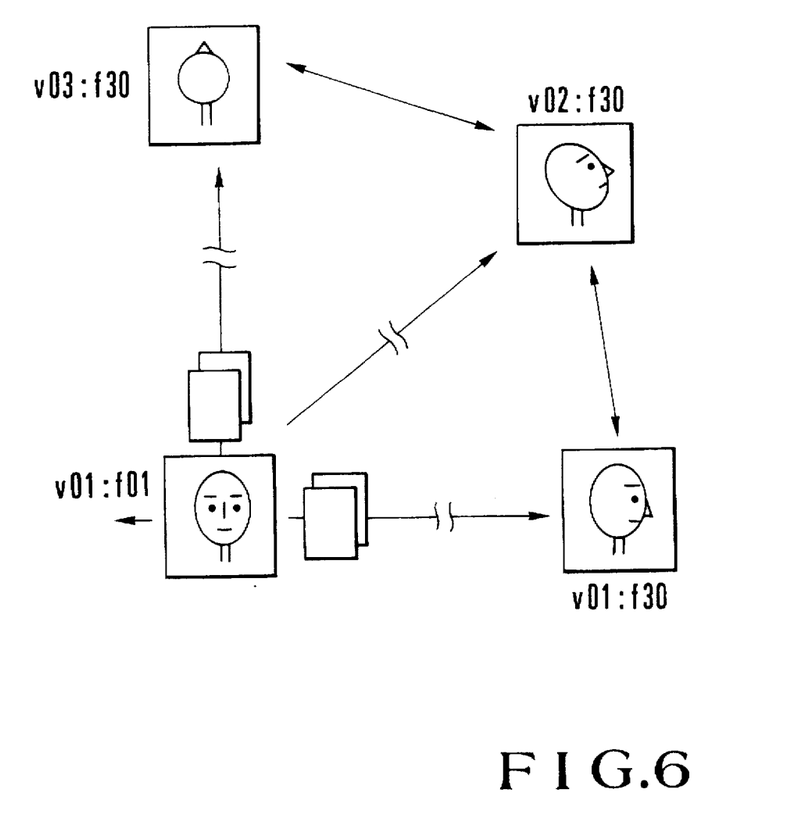
FIG. 6 is a view showing states of changes in image to be displayed.

A state of a change in video image will be described with reference to FIG. 6, provided that the image of v01:f01 in FIG. 3 is displayed on the image display means 6 as an initial image. In this case, assume that the state signal detecting means 2 outputs a signal for designating a right direction on the screen (this signal is referred to as "→" hereinafter). The current frame number in the table of FIG. 4 is v01:f01. If the input signal represents "→", it is found that the next frame number is v01:f30 from v01:f01. This is output as a set of frame numbers. This sequence is a series of images to represent that a person turns his face to the right from the state in which he looks straight.

Assume that the state signal detecting means 2 outputs a signal for designating the upper direction (this signal is referred to as "↑" hereinafter) of the screen in this state. In this case, when the input signal is "↑" in the frame number of v01:f30, frame numbers to be output next are v02:f30 and v03:f30 in accordance with the rules in FIG. 4. This sequence represents that the person who has turned his face to the left turns his face to the upper left direction and then upward.

The faces turned in the directions corresponding to the output contents of the state image detecting means 2 are sequentially displayed, as described above. Even if images are not stored in a sequential state, the stored images are appropriately combined and displayed like v01:f30, v02:f30, and v03:f30. Therefore, the display states have a considerable degree of freedom.

In step 103, the image reproducing means 5 controls the image storage means 4 to display video images corresponding to the designated frames on the image display means 6 on the basis of outputs from the display frame determining means 3. The flow returns to step 100 to execute processing corresponding to a signal from the communication line again. After the frame display having the numbers designated by the image reproducing means 5 is started, the flow may return to step 100 without completing the operation in step 103.

Figure 5:
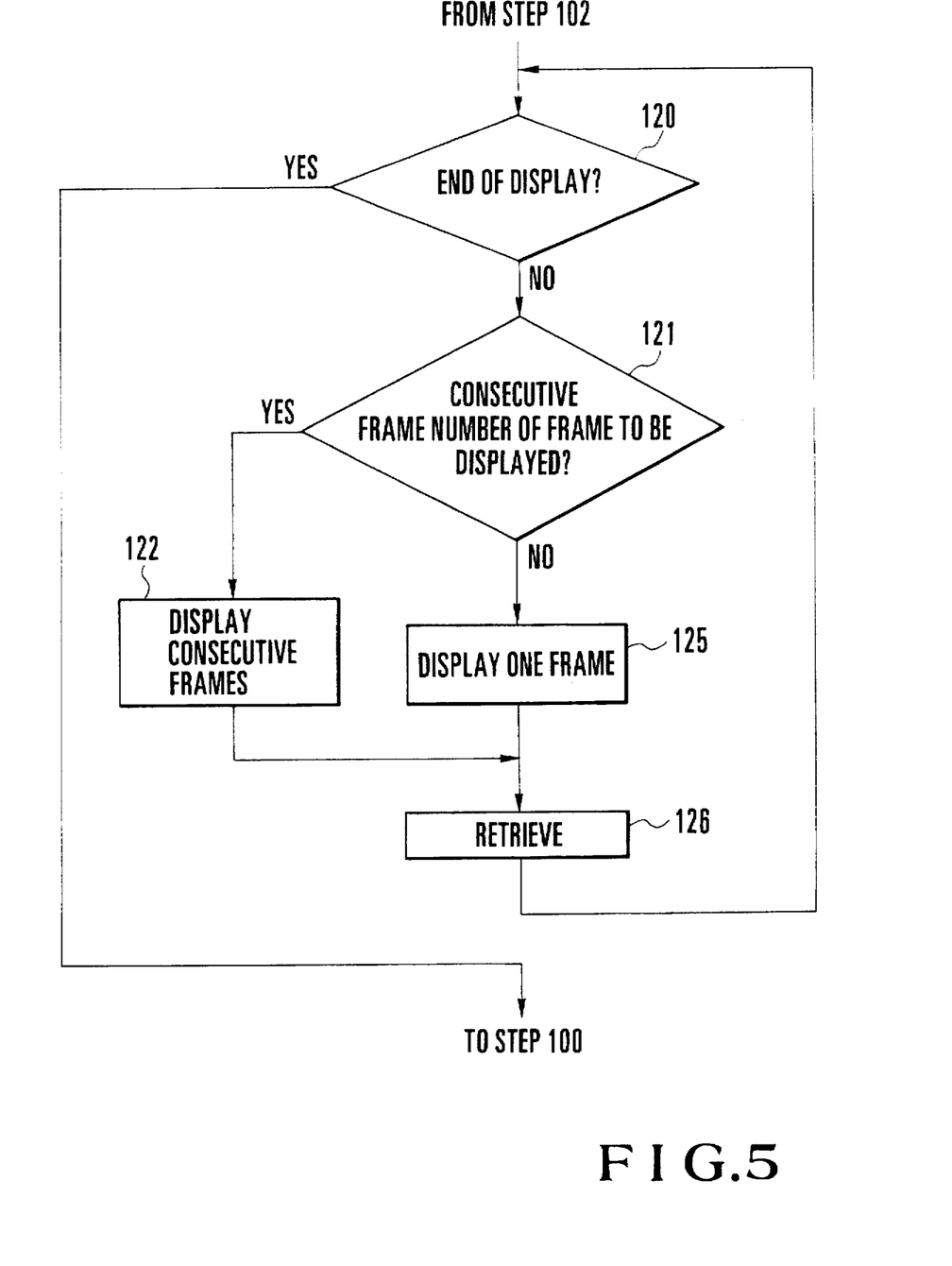
FIG. 5 is a flow chart showing a method of changing a frame displayed in FIG. 2.

FIG. 5 shows the detailed operations in step 103 for displaying the designated frames. The image storage means 4 stores at least one video sequence as a set of continuous video frames. When video frames are output from this video sequence, the image reproducing means 5 sequentially retrieves the video frames so as to display them in a continuous state and continuously displays them. Note that a series of video frames having consecutive numbers need not be retrieved and are continuously displayed.

When it is determined in step 120 that the display is not completed, the flow advances to step 121 to determine whether frame numbers of frames to be displayed are consecutive. If YES in step 121, the flow advances to step 122 to display the consecutive frames. Upon completion of the display, it is determined in step 126 whether frames having the consecutive frame numbers are additionally present. If NO in step 126, the display is ended.

If it is determined in step 121 that a series of frame numbers are not consecutive, the flow advances to step 125 to display the first designated frame, and the flow returns to step 120. If the display is not completed, the same processing is repeated to display the next frame. When it is determined in step 120 that the display is completed, the flow is ended.

To determine whether the display is completed is to set the number of frames to be displayed and count down the preset value every time the frame is displayed.

Different signals are used to control the image storage means 42 depending on the types of image storage means 4. For example, when the image storage means 4 is the PV-S98, the control signals are an instruction for retrieving a designated frame number and displaying the designated frame and an instruction for setting the video tape recorder in a play mode. However, if the image storage means 4 is the LD-V540, the control signals are an instruction for retrieving a designated address and an instruction for performing reproduction.

Even if the image storage means 4 is a hard disk or semiconductor memory, signals are converted into control signals for displaying a designated frame number and a set of designated frame numbers.

Figure 7:
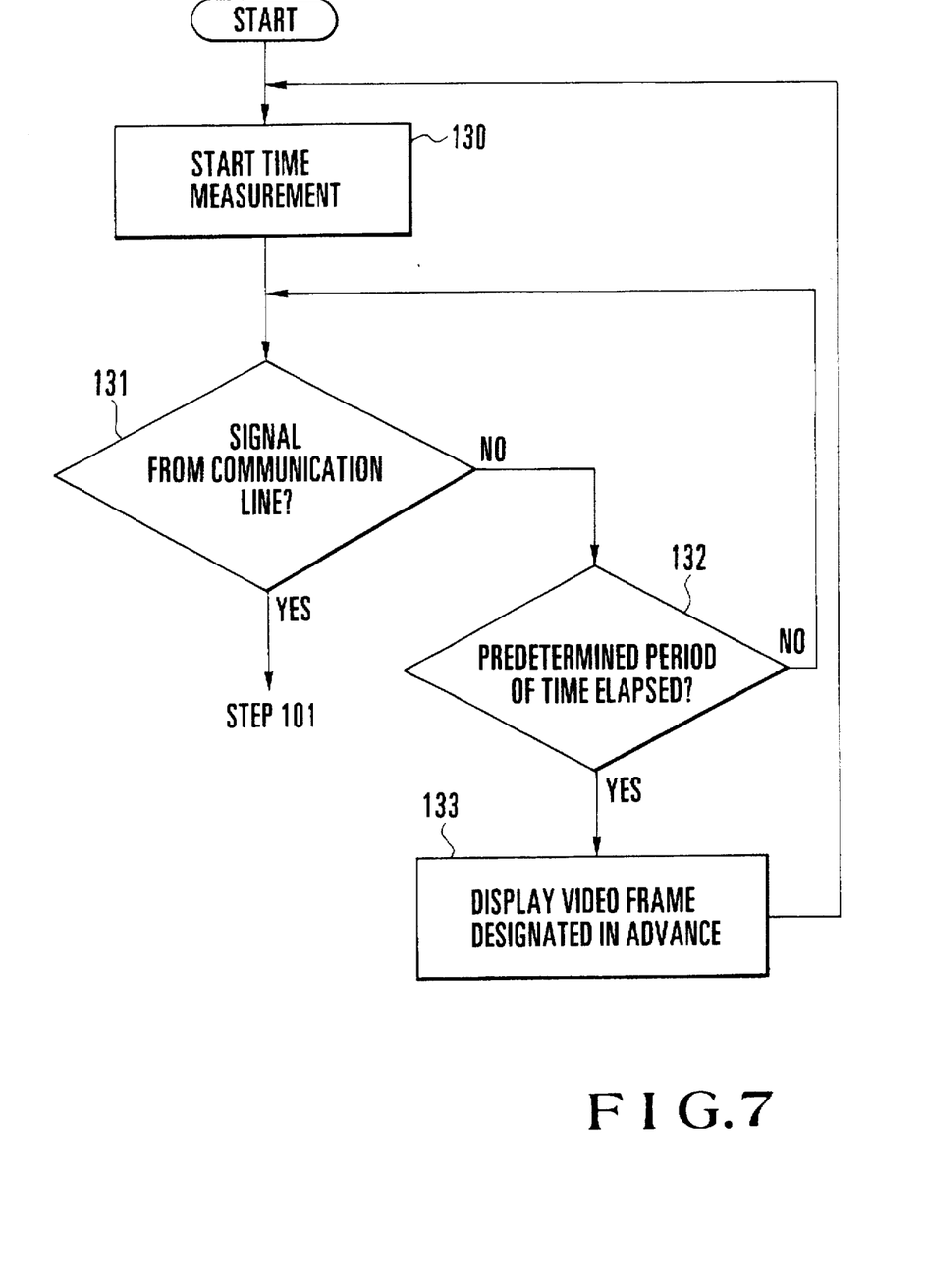
FIG. 7 is a flow chart showing operations in a display state set when an input is not received for a predetermined period of time.

FIG. 7 shows a processing sequence for displaying a video image in accordance with a technique of claim 9. This apparatus is characterized in that a predetermined video image is extracted from the image storage means 4, reproduced, and displayed when a signal is not received from a communication line for a predetermined period of time.

In step 130, a time measurement is started. It is determined in step 131 whether a signal is received from the communication line. If YES in step 131, the operations from step 101 are performed; otherwise, it is determined in step 132 whether a predetermined period of time has elapsed, i.e., whether a signal is not received from the communication line for the predetermined period of time.

If YES in step 132, the flow advances to step 133 to cause the image reproducing means 5 to extract a frame or a set of frames of a designated video image from the image storage means 4 and displays the extracted frame or frames. For example, assume that an image representing laughing in the frame of v01:f01 is displayed when any signal is not received through the communication line for the predetermined period of time. In step 132, control waits for a signal from the communication line within the predetermined period of time.

Figure 8:
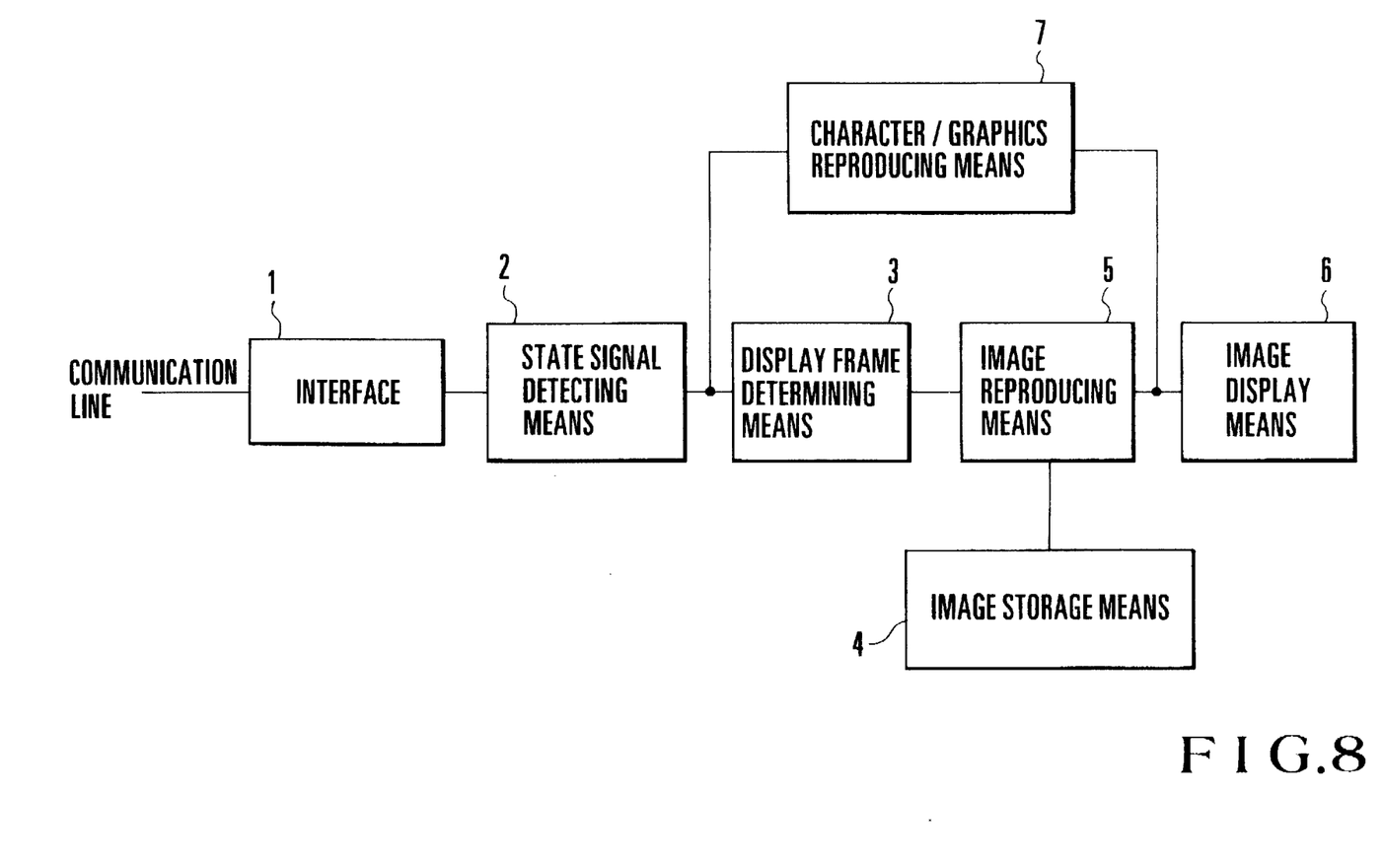
FIG. 8 is a block diagram showing an apparatus for simultaneously displaying character or graphics data together with an image.

FIG. 8 shows an arrangement defined in claim 9. A character/graphics reproducing means 7 is added to the arrangement in FIG. 1. Character or graphics information is reproduced from an output from the state signal detecting means 2. In addition to the image from the image reproducing means 5, the character or graphics information is displayed on the image display means 6. This apparatus is characterized in that character or graphics information synchronized with a video image is superposed on the video image.

Figure 9:
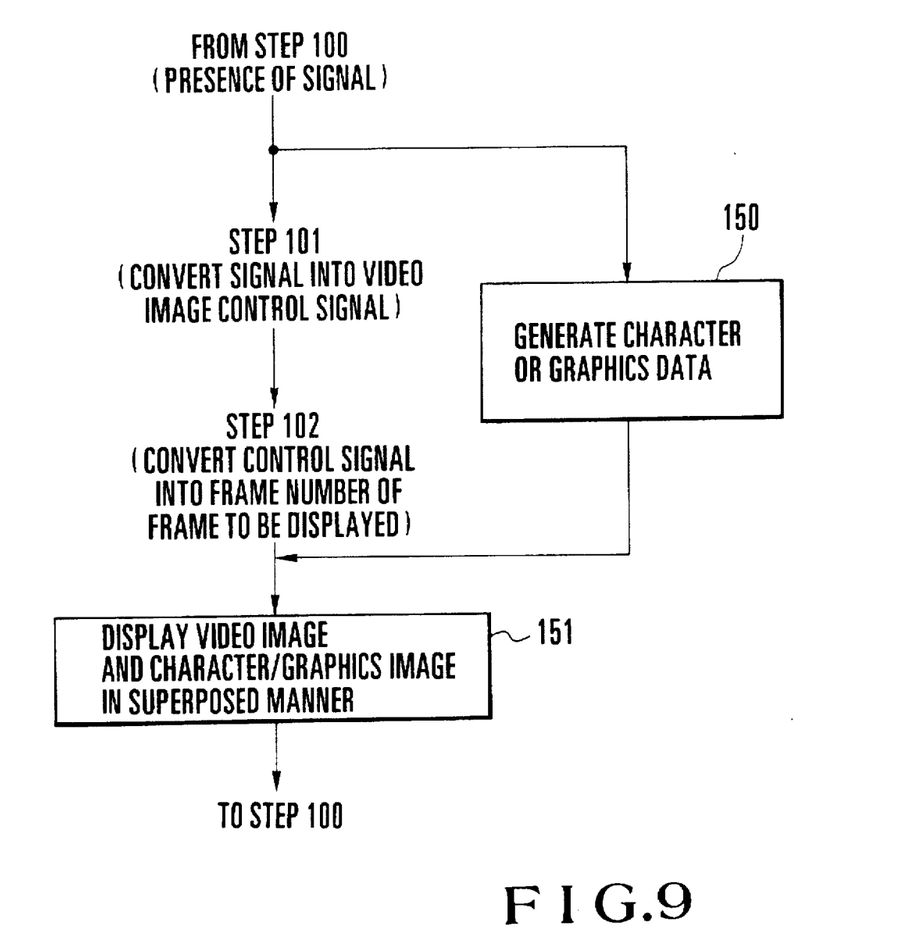
FIG. 9 is a flow chart showing operations of the apparatus shown in FIG. 8.

FIG. 9 shows the operations of the apparatus shown in FIG. 8. When a signal from the communication line is detected in step 100, the character/graphics reproducing means 7 generates character/graphics data in accordance with a predetermined algorithm, while the operations in steps 101 and 102 are being performed.

In this case, information is displayed to be superposed on the displayed video image. For this reason, the character/graphics reproducing means 7 uses an arbitrary algorithm. For example, the signal output from the state signal detecting means 102 through the communication line may be directly output, or an animation may be controlled on the basis of the output signal.

The video image reproduced by the image reproducing means 5 is superposed on the character/graphics data reproduced in step 150.

In this case, the image display means 6 must have a function of superposing the video image on the graphics data and displaying the superposed image. A product having this function is an NEC VP150. An arrangement obtained by connecting this product to a CRT display can be used as the image display means 6.

An image in the image storage means used in the above arrangement may be a pickup image obtained by picking up a partner's image or a computer graphics image, which is stored in the image storage means 4. In addition, a computer graphics image generated on the basis of contents designated from the transmitting end may be used, as needed, except for the data stored in the image storage means 4. In this case, image information is generated upon designation, so that the memory capacity can be reduced to obtain an economical advantage, depending on applications which allow time delays.

In the above embodiment, a frame to be displayed next is obtained from the table shown in FIG. 4. However, this frame may be obtained by a calculation using the reference in FIG. 10.

Figure 10:
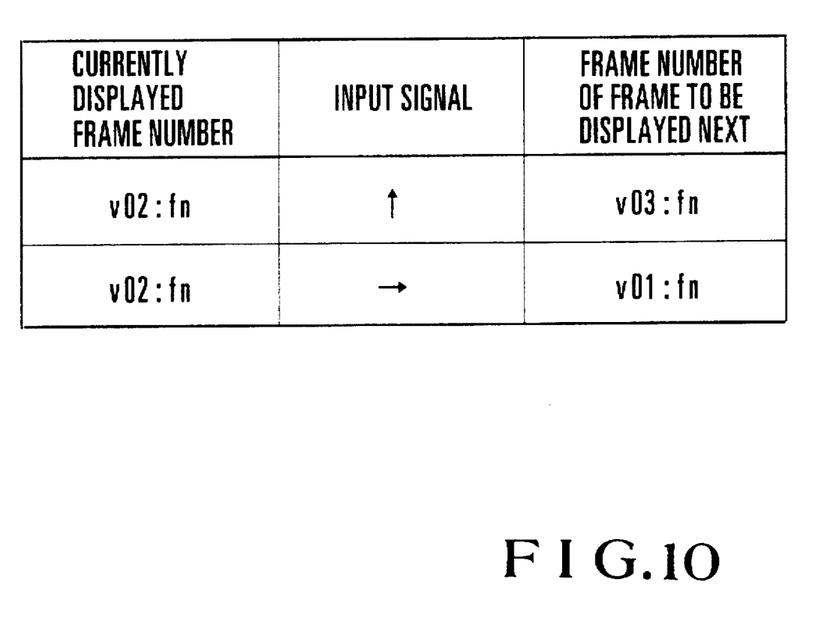
FIG. 10 is a view showing another method of obtaining a frame to be displayed.

Assume that an image representing "facing upper left" and represented by v02:f30 has been displayed. In this case, assume that "↑" representing upper direction is input as a request signal. A frame number representing a frame to be displayed next is v03:fn. That is, a calculation is performed to replace "n" with a corresponding frame number. Note that the calculation formula can be arbitrarily selected to match the image to be displayed.

According to the present invention, as has been described above, only a signal representing a state is transmitted from a transmitting end, and image information is read out and displayed at a receiving end in accordance with the received signal. An amount of information of the signal sent from the transmitting end can be reduced to display an image as compared with a technique for directly transmitting the information signal. For this reason, even if a communication line whose amount of information to be transmitted is limited is used, a display with a feeling of "presence" can be performed.

What is claimed is:

1. An image display apparatus for displaying a state of a transmitting end in a form of an image at a receiving end, comprising:

image information storage means for storing image information for a plurality of images representing a plurality of states;

state signal detecting means for detecting and converting a state signal supplied from a communication line into a control signal for designating an image representing the state;

display frame determining means for obtaining a present frame number from said control signal, said present frame number corresponding to an image to be displayed at a given time, said display frame determining means also for obtaining a next frame number of an image to be displayed next in accordance with the given frame number;

image reproducing means for reproducing a stored image from said image storage means on the basis of the frame number calculated by said display frame determining means; and image display means for displaying said stored image reproduced by said image reproducing means, wherein each of said plurality of states corresponds to a condition at said transmitting end.

2. The apparatus according to claim 1, wherein said image reproducing means includes means for selecting, on the basis of the control signal, a set of appropriate frame numbers from an image stored in said image storage means, the set being continuously reproduced by said image reproducing means.

3. The apparatus according to claim 1, wherein said image reproducing means reproduces the image by outputting the frame number or the set of frame numbers designated in advance when the control signal is not present for not less than a predetermined period of time.

4. The apparatus according to claim 1,
further comprising character/graphics reproducing means for generating at least one of a character image and a graphics image in accordance with the control signal, and wherein said image display means displays the image reproduced by said image reproducing means and an output from said character/graphics reproducing means in a superposed manner.

* * * * *